United States Patent [19]

Nakajima et al.

[11] Patent Number: 4,773,080
[45] Date of Patent: Sep. 20, 1988

[54] DATA COMMUNICATION EQUIPMENT

[75] Inventors: Toshifumi Nakajima, Kawasaki; Hirofumi Yoshiyama, Tokyo; Hisao Terajima, Yokohama, all of Japan

[73] Assignee: Canon Kabushiki Kaisha, Tokyo, Japan

[21] Appl. No.: 724,541

[22] Filed: Apr. 18, 1985

[30] Foreign Application Priority Data

Apr. 25, 1984 [JP] Japan .................................. 59-82072
Apr. 26, 1984 [JP] Japan .................................. 59-83020

[51] Int. Cl.⁴ ........................ H04M 11/08; H04N 1/32
[52] U.S. Cl. ........................................... 375/5; 375/8; 358/257; 379/90; 379/100
[58] Field of Search .................... 375/5, 8; 179/2 DP, 179/84 T; 379/90, 100, 102, 106; 358/257

[56] References Cited

U.S. PATENT DOCUMENTS

B 462,030  3/1976  Fahrenschon et al. .......... 179/2 DP
3,084,213  4/1963  Lemelson ............................ 358/256
3,524,935  8/1970  Gonsewski et al. ............. 179/2 DP
4,055,729 10/1977  Vandling ........................ 179/2 DP
4,353,097 10/1982  Takeda et al. .................. 179/2 DP Primary Examiner—Robert L. Griffin
Assistant Examiner—Marianne Huseman
Attorney, Agent, or Firm—Fitzpatrick, Cella, Harper & Scinto

[57] ABSTRACT

A data communication equipment has a data communication device, a speech communication device, a selection device for selecting the data communication device or the speech communication device to set the data communication equipment in a data communication mode or a speech communication mode, a detection device for detecting non-data communication mode of a partner station when the data communication equipment is set in the data communication mode, and an output device for outputting a sound on the basis of a sound signal through the communication line.

6 Claims, 13 Drawing Sheets

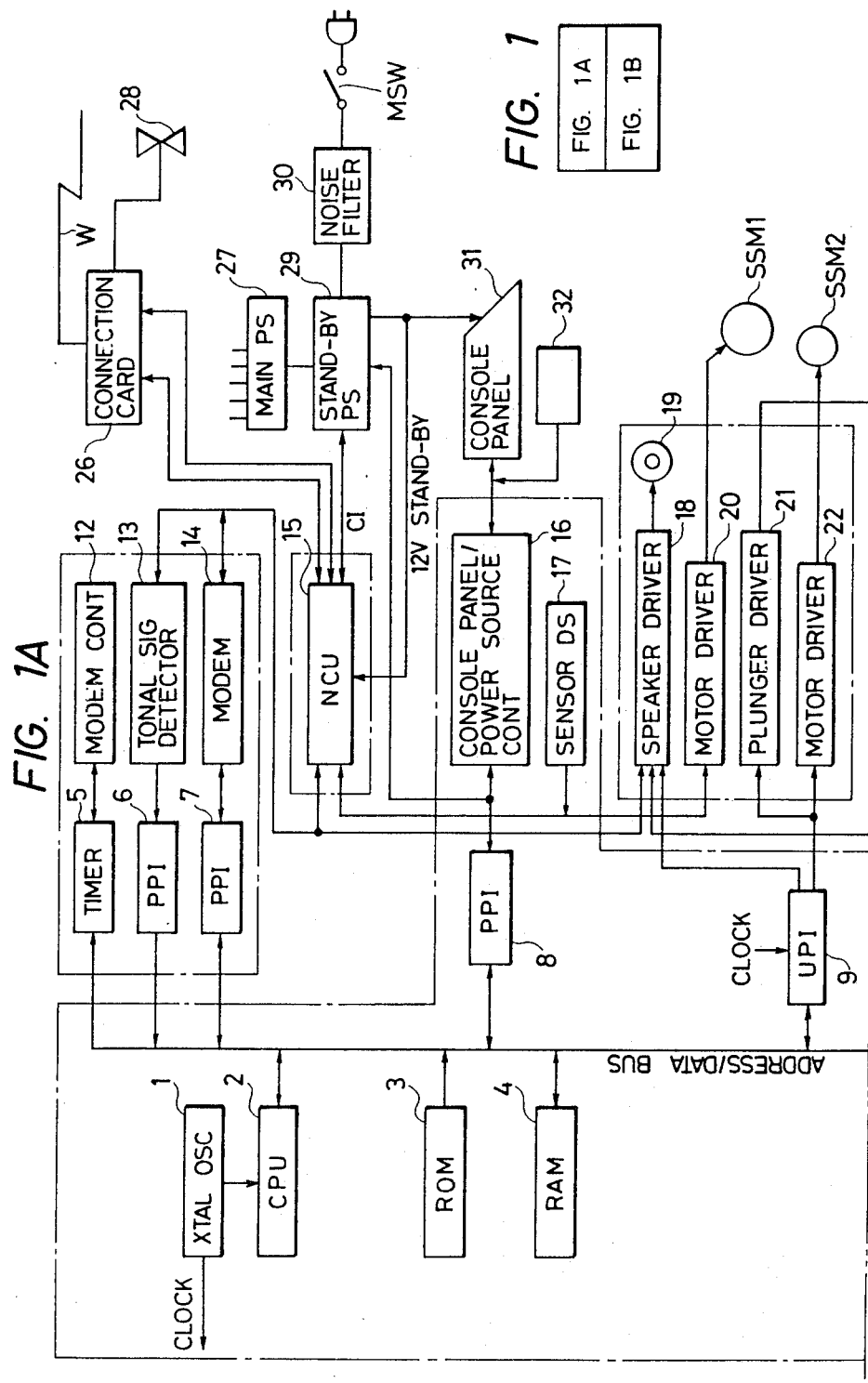

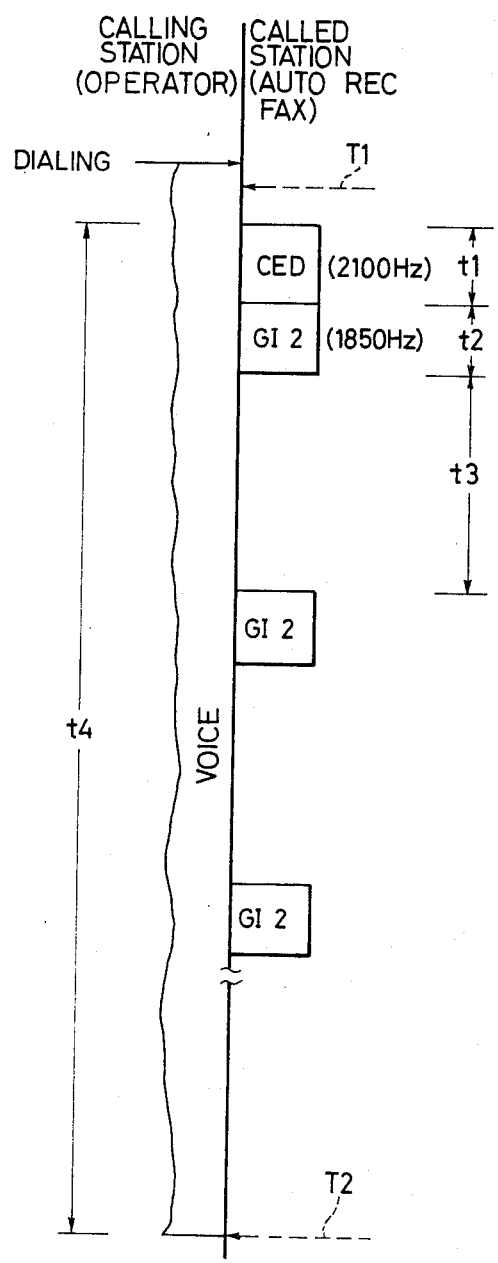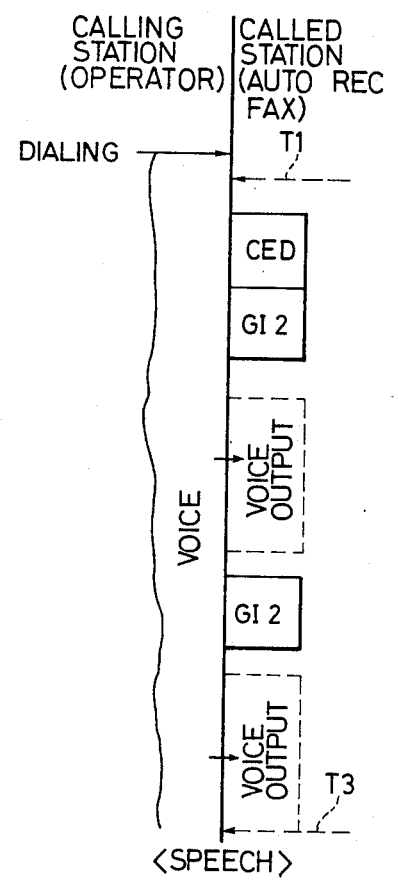
FIG. 4A PRIOR ART
FIG. 4B

| FIG. 6A | FIG. 6B |

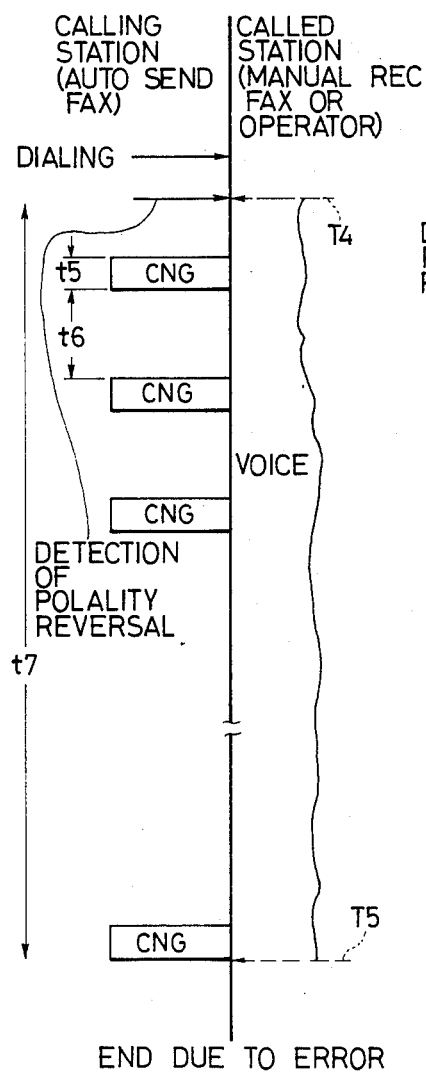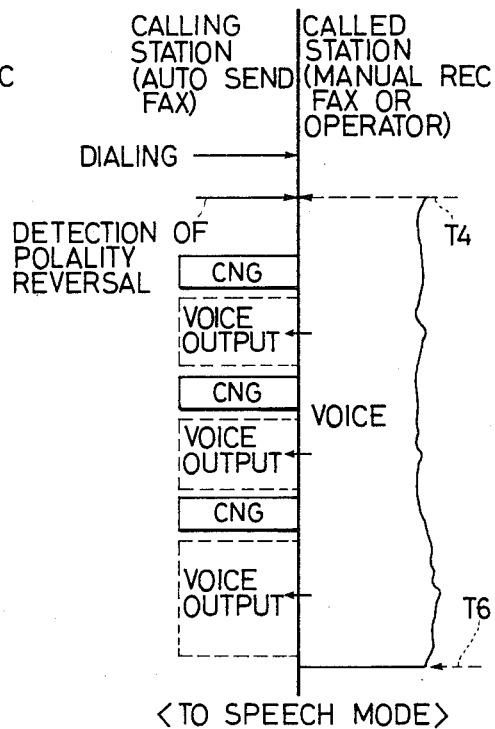
FIG. 9A PRIOR ART
FIG. 9B

DATA COMMUNICATION EQUIPMENT

BACKGROUND OF THE INVENTION

1. Field of the Invention

The present invention relates to communication equipment, and more particularly to data communication equipment for communicating data such as image data or text data through a line.

2. Description of the Prior Art

Prior art equipment of this type such as a facsimile machine is connected to a telephone line and communicates images through the telephone line. A receiving facsimile machine usually has an auto-receive mode and a manual receive mode so that the telephone line can be used for the image communication and speech communication.

In the auto-receive mode, if a call from the line occurs, the line is automatically switched from the telephone set to the facsimile machine and the image is automatically received in accordance with a predetermined facsimile procedure. In the manual receive mode, an operator responds to the call from the line and the image is received as a result of manipulation of facsimile controls by the operator. When the receiving facsimile machine is in the manual receive mode, the telephone set can be used for speech communication. However, when the receiving facsimile machine is in the auto-receive mode and the sending station wishes to effect speech communication through the telephone set the receiving facsimile machine acts as through an error had occurred because it does not receive the facsimile signal.

The sending facsimile machine may have an auto-transmit mode and a manual transmit mode. In the auto-transmit mode, the facsimile machine automatically calls the line, and when the line is connected, it automatically switches the line from the telephone set to the facsimile machine so that an image can be automatically transmitted in accordance with a predetermined facsimile procedure. However, when the sending facsimile machine is in the auto-transmit mode, speech communication is not possible even if the receiving facsimile machine is set in the manual receive mode to initiate speech communication.

The facsimile machine has an alarm function for generating an alarm sound so that the operator can quickly handle an error, and an auto-dialing function. It may have a sound monitor of the telephone line to allow effective use of those functions. The facsimile machine has a volume controller so that a user can control the sound level. The volume controller is arranged internally or externally of the machine. When it is arranged internally of the machine, the user cannot readily manipulate it and he/she has to call a serviceman whenever he/she wants to adjust the sound level. When it is arranged externally of the machine, cost/performance is relatively poor because it is not frequently used.

SUMMARY OF THE INVENTION

It is an object of the present invention to improve a data communication equipment.

It is another object of the present invention to provide a data communication equipment which makes possible, with an inexpensive construction, speech communication between a calling station and a called station irrespective of the communication mode set at the called station.

It is another object of the present invention to provide a data communication equipment which makes possible, with an inexpensive construction, speech communication between a calling station and a called station irrespective of a communication mode in the calling station.

It is another object of the present invention to provide a data communication equipment which can automatically control a sound level of a sound generating function with a simple construction.

According to the present invention, these objects are attained by means of data communication equipment comprising first communication means, e.g., data communication means, and speech communication means, and means for selecting one of those two communication means to set the equipment in, e.g., a data communication mode or a speech communication mode, and means for outputting a sound on the basis of a sound signal through a communication line when the equipment is in a particular one of the modes.

BRIEF DESCRIPTION OF THE DRAWINGS

FIGS. 1A and 1B represent a block diagram of an overall configuration of a first embodiment of the present invention, FIG. 4A shows a communication protocol in a conventional G2 facsimile machine, FIG. 4B shows a communication protocol in a G2 facsimile machine of the first embodiment, FIG. 9A shows a communication protocol of a conventional facsimile machine, FIG. 9B shows a communication protocol of a facsimile machine of the second embodiment.

DETAILED DESCRIPTION OF THE PREFERRED EMBODIMENTS

First, second and third embodiments of the present invention will be explained with reference to the drawings.

The first embodiment, which enables speech communication between a calling station and a called station irrespective of the communication mode set in the called station, is first explained.

Figure 1B:
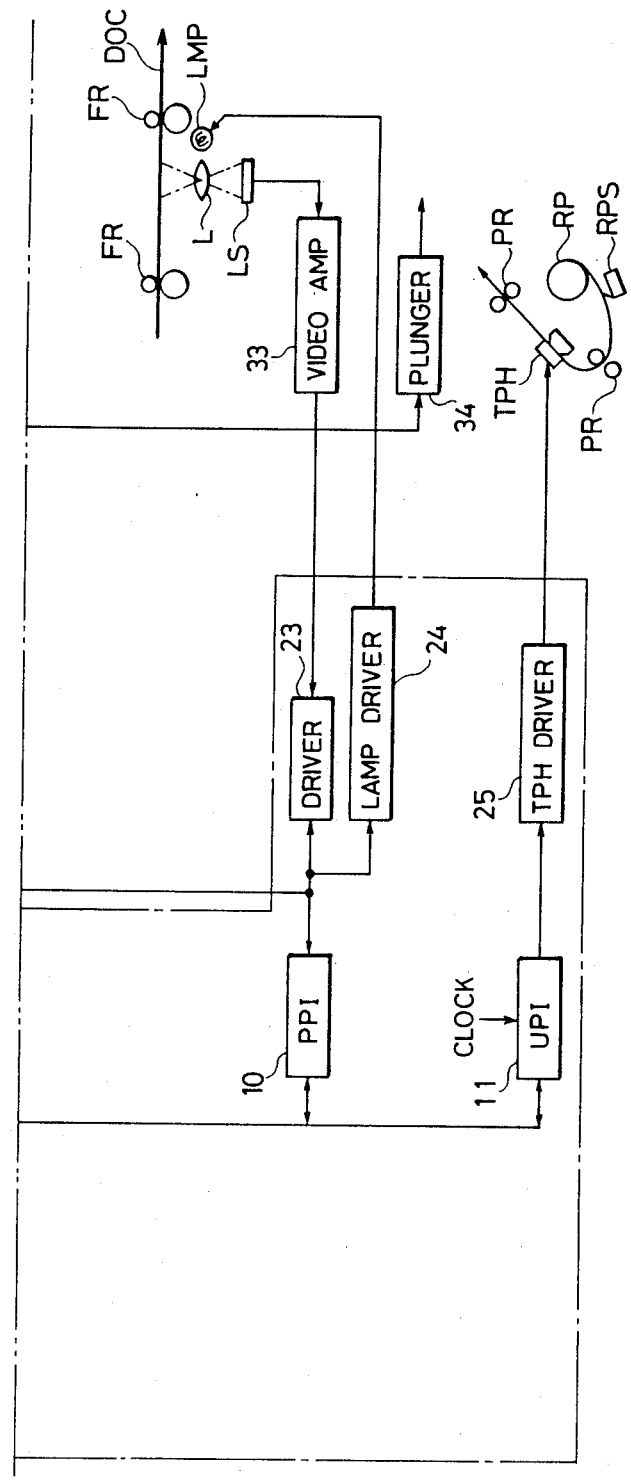

FIG. 1 is a block diagram of an overall configuration of the first embodiment of the facsimile machine. Numeral 1 denotes a crystal oscillator which generates a reference clock to the machine. The clock from the crystal oscillator 1 is supplied as the reference clock to a central processing unit (CPU) 2, which may comprise a microprocessor. The CPU 2 is connected to a ROM 3, a RAM 4, a timer 5, programmable parallel I/O (PPI) 6, 7, 8 and 10 and universal programmable interfaces (UPI) (peripheral CPU) 9 and 11.

A modem controller 12, a tonal detector 13 and a modem 14 are connected to the timer 5 and the PPI's 6 and 7, respectively, and data are inputted and outputted to and from a communication line through those I/O ports. A subscriber telephone line W and a telephone set 28 are connected to the tonal detector 13 and the modem 14 through a connection card (wiring board) 26.

The PPI 6 controls the data input/output to and from a console panel 31 and controls a power supply. It is connected to the console panel 31 and a feed switch 32 through the PPI 8 and a console panel/power supply controller 16. The console panel 31 has a known telephone switch by which the telephone line connected to the facsimile machine is connected to the telephone set 28 to switch the mode from a facsimile communication mode to a normal telephone mode.

The UPI's 9 and 11 control the operation of the record unit. A plunger driver 21 which controls a record paper cutter plunger 34 and a motor driver 22 which controls a record paper feed motor SSM 2 are connected to the UPI 9. A thermal printing head TPH is connected to the UPI 11 through a thermal head driver 25 so that the UPI 11 drives the thermal head TPH in accordance with data which is thereby recorded. The record paper RP is fed by a pinch roller PR which is driven by the motor SSM2 as the record operation proceeds. A record paper sensor which comprises a photo-interrupter and a limit switch is arranged in a feed path of the record paper.

The PPI 10 inputs and outputs data to and from a read unit and an alarm unit. An image data processor/driver 23, and a lamp driver 24 are connected to the PPI 10. An original document DOC is illuminated by a light source LMP which is controlled by the lamp driver 24, and fed by a feed roller FR which is driven by the motor driver 20 and the document feed motor SSM1, and light reflected by the original document DOC is focused on a line sensor LS such as a CCD sensor through a lens L.

An image data output from the line sensor LS is amplified by an amplifier 33, an output thereof is applied to the image data processor/driver 23, an output of which is then sent to a main data bus through the PPI 10.

A speaker 19 is connected to the PPI 10 through a speaker driver 18. Such speaker 19 has also been provided in prior art equipment to inform the operator of a lack of record paper or of an error such as a failure in communication protocol. In the present invention, it is also used to identify a calling terminal. When an alarm is to be issued, the speaker 19 is driven by a drive signal generated by the UPI 9 to generate a buzzer sound.

Power to the machine is supplied from a main power supply 27. In a stand-by state, the main power supply 27 is off and a stand-by power supply 29 supplies power only to a console panel 31 and a network control unit (NCU) 15. A commercial A.C. power line is connected to the power supplies 27 and 29 through a main switch MSW and a noise filter 30.

The NCU 15 has an auto-receive function and switches the line from the telephone set 28 to the facsimile machine in response to a call signal CI from the telephone line. The main power supply 27 is activated through the console panel/power supply controller 16 so that the power is supplied to the tonal detector 13 and the modem 14. The main power supply may be turned on from the console panel 31.

Figure 2:
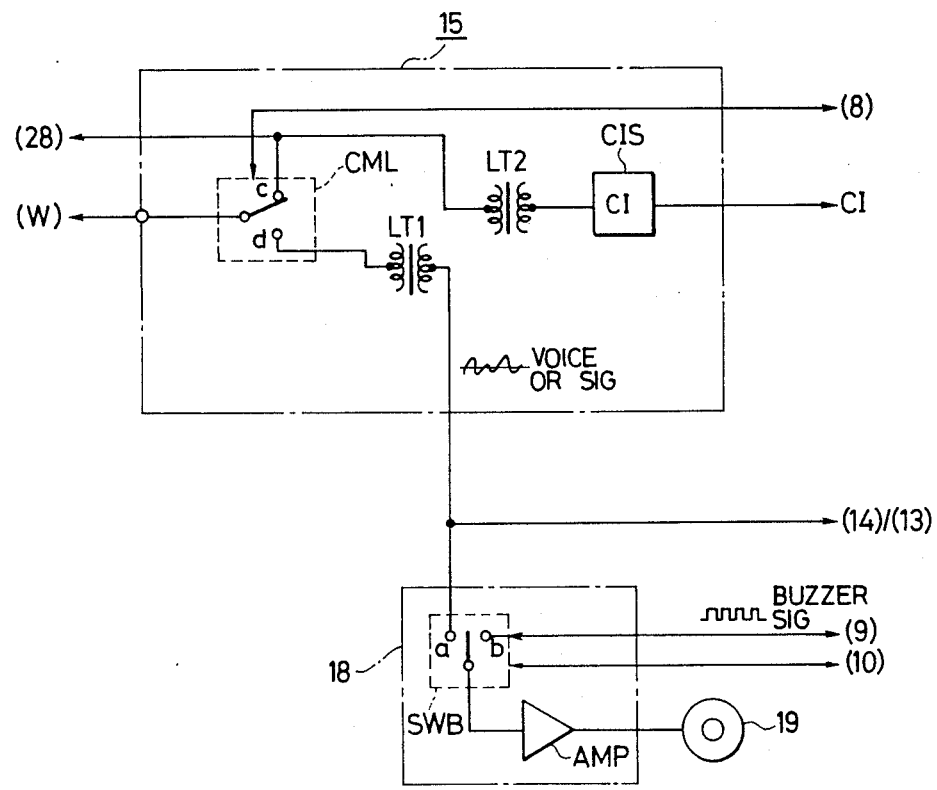
FIG. 2 is a block diagram of the periphery of the NCU in the first embodiment.

FIG. 2 shows the configuration of a main portion of the NCU 15 and the driver 18. The telephone line W is normally connected to the telephone set 28 by a relay CML. The telephone set 28 is connected to an upper terminal of the relay CML and a call signal detector CIS is also connected to the upper terminal of the reley CML through an insulation transformer LT2. When the call signal is applied from the line, the call signal detection signal CI is produced by the call signal detector CIS so that the main power supply is activated and the activated CPU 2 switches the relay CML to the tonal signal detector 13 and the modem 14 through the PPI 8. The telephone line W is isolated from the tonal detector 13 and the modem 14 by the transformer LT1 in the connecting state.

The speaker driver 18 has an amplifier AMP which amplifies the drive signal supplied through the switch SWB to drive the speaker 19. A signal line extending from the telephone line to the modem 14 and the tonal signal detector 13 is connected to one contact of the switch SWB and a sound signal for informing alarm or completion of normal operation, generated by the UPI 9 is supplied to the other contact. The switching of the switch SWB is controlled by the CPU 2 through the PPI 6 in accordance with a procedure to be described later.

The NCU 15 shown in FIG. 2 has an off-hook detector for various known communication controls, although it is omitted from FIG. 2.

Figure 3:
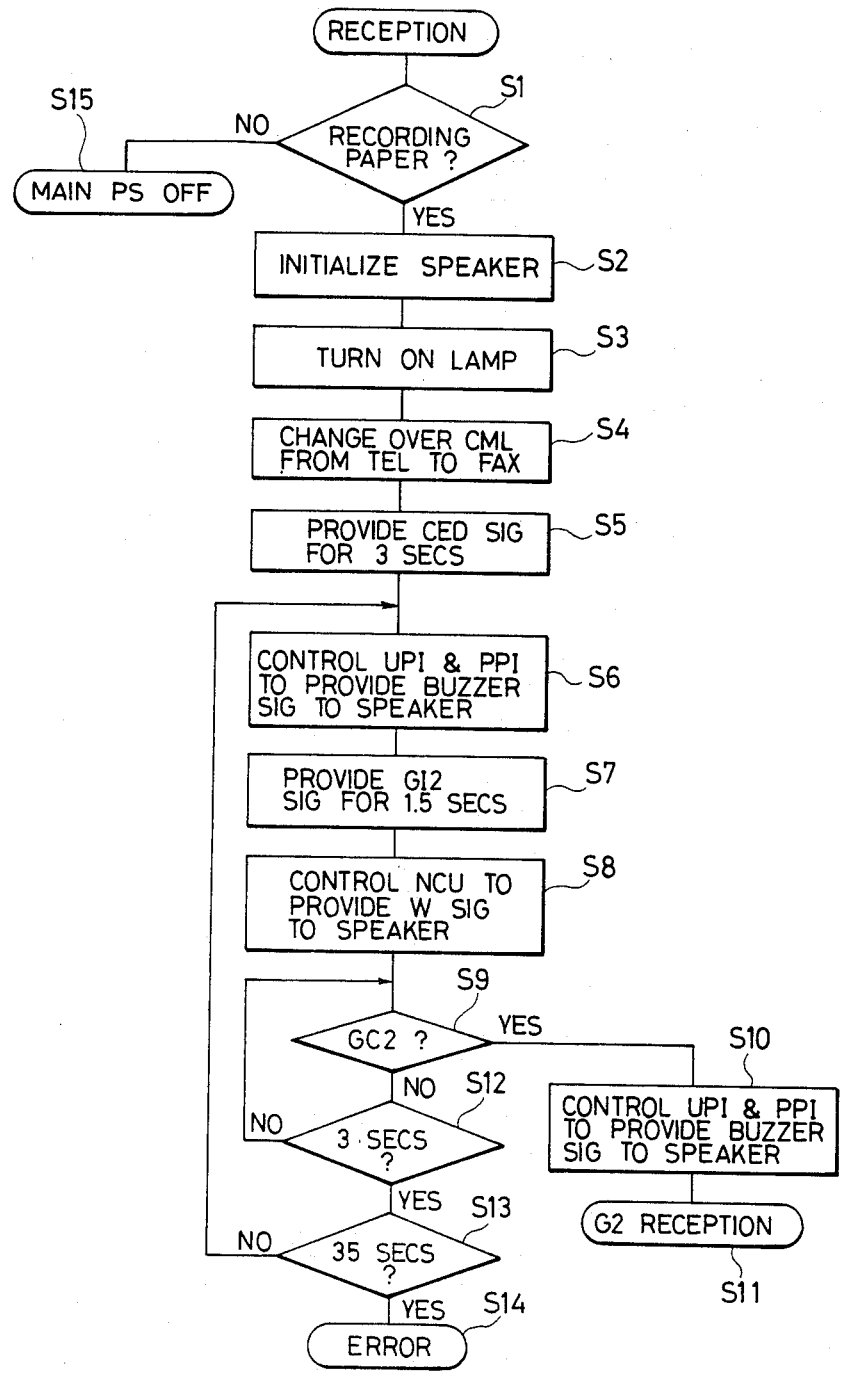
FIG. 3 is a flow chart showing a communication protocol in the first embodiment.

The auto-receive operation in the configuration described above is explained in detail with reference to the flow chart of FIG. 3. A control procedure of the CPU 2 in a G2 facsimile procedure in accordance with the CCITT Recommendation T3 is explained.

When a call signal is received from the telephone line, the main power supply 27 is first activated and the CPU 2 starts to control. In a step S1 of FIG. 3, the CPU 2 examines the output of the record paper sensor RPS to determine the presence or absence of the record paper RP. If the record paper RP is absent, the process goes to a step S15 where the main power supply is turned off through the PPI 8 and the communication is terminated with error. An alarm sound may be generated in this case by the speaker 19.

In a step S2, the speaker 19 is initialized. The CPU 2 connects the switch SWB of FIG. 2 to a right contact b through the PPI 10 to allow inputting of the drive signal from the UPI 9. The timer 5 is started at this moment to control various timings such as initial indentification time necessary to identify a signal in a pre-procedure of the facsimile communication.

In a step S3, the light source LMP of the document reader is turned on in order to stabilize the light output of the light source LMP in preparation for image transmission requested by polling. In a step S4, the relay CML in FIG. 2 is switched to the modem 14 and succeeding stages of the facsimile machine.

In a step S5, a called equipment discrimination (CED) signal is sent out of the modem 14 to the telephone line W.

In a step S6, the switch SWB in FIG. 2 is switched to the right contact b so that the buzzer speaker drive signal from the UPI 9 is supplied to the speaker 19. Thus, the speaker 19 is not driven by the CED signal. In a step S7, a G2 identification signal GI2 is sent out to the line for 1.5 seconds. In a step S8, the switch SWB is switched to the left contact a so that the speaker 19 is driven by the signal on the telephone line W. Accordingly, if the calling station has a sound terminal and an operator says, e.g., "hello", the sound is generated from the speaker 19.

In a step S9, it is determined whether the tonal detection 13 has detected the GC2 signl from the partner station. The detection is effected until the timer 5 detects the elapse of three seconds in a step S12, that is, for three seconds. As is well known, since the facsimile procedure is executed by a procedure signal (tonal signal) having a predetermined freguency in the G2 mode, the identification of the signal of the partner station is effected by the tonal detector 13. The tonal detector 13 measures a pulse width of the signal supplied from the telephone line W by the reference clock to detect the frequency of the received signal.

If the GC2 signal is detected by the tonal detector 13 in the step S9, the switch SWB is again switched to the right contact b in FIG. 2 in a step S10 to connect the speaker 19 to the UPI 9, and in a step Sll the conventional G2 facsimile communication is performed.

On the other hand, if the GC2 signal is not received, the process procedes from the step S12 to a step S13 in which it is determined whether the predetermined initial identification time of 35 seconds has elapsed since the reception of the calling signal. If the 35-second period has not elapsed, the process returns to the step S6 and the above steps are repeated. If the 35-second period has elapsed, the communication is terminated with error in a step S14, the switch SWB is connected to the contact b of the UPI 9, the relay CML is connected to the telephone set 28 and then the main power supply 27 is turned off. An error alarm sound is generated by the speaker 19.

If the operator in the calling station wants speech communication, his/her sound is generated from the speaker. Thus, the operator connects the telephone set 28 to the line by the switch on the console panel 31 and the speech communication is achieved, in the same manner as the normal telephone. This is illustrated in FIGS. 4A and 4B.

FIG. 4B shows a control procedure in the first embodiment and FIG. 4A shows a prior art procedure for comparison purpose.

As seen from FIG. 4A, when the operator calls the called station facsimile machine which is in an auto-receive mode, through the telephone set, the line is switched from the telephone set to the facsimile machine by the NCU of the facsimile machine at a time Tl and then the called station facsimile machine sends out the CED signal and the GI2 signal having durations of t1 (usually three seconds) and t2 (usually 1.5 seconds), respectively. The signal GI2 is repeatedly sent at an interval of time t3 and the reception of the corresponding procedure signal is monitored.

However, since the calling station terminal is the telephone set and cannot send the procedure signal, the called station facsimile machine cuts off the line at a time T2 after the elapse of the initial identification time period t4 (35 seconds), and terminate the communication with error.

On the other hand, in the first embodiment, as shown in FIG. 4B, when the line is switched from the telephone set to the facsimile machine at the time T1, the speaker 19 generates the sound of the operator of the called station if the calling station is the sound terminal because the speaker 19 is driven by the signal on the line except when the signals CED and GI2 are transmitted. Accordingly, the operator of the called station facsimile machine switches the line to the telephone set by manual operation at time T3 so that speech communication is thereafter achieved.

While the G2 facsimile machine is shown in the present embodiment, the present embodiment can be applied to other types of facsimile machines.

Figure 5A:
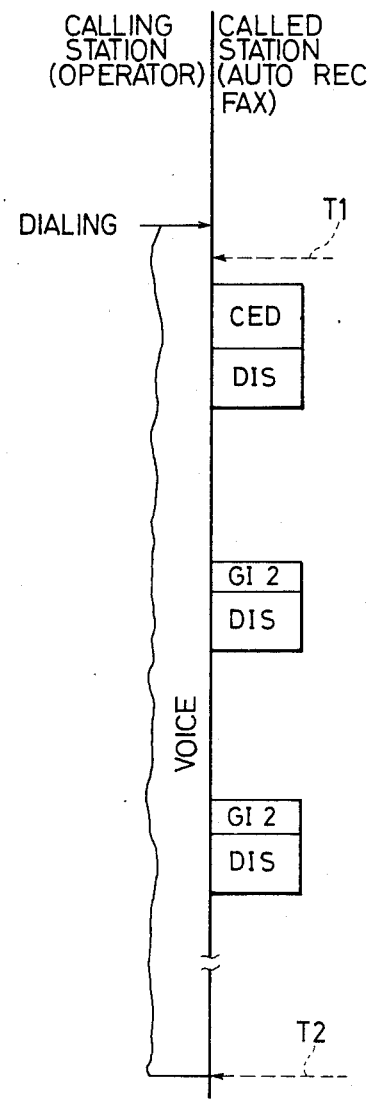
FIG. 5A shows a communication protocol in a conventional G2/G3 facsimile machine.
Figure 5B:
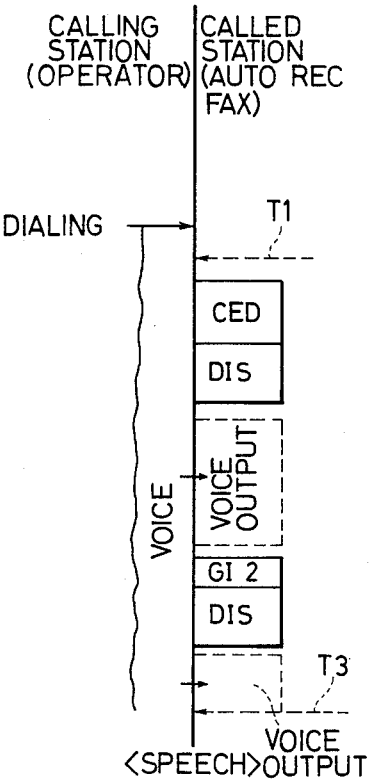
FIG. 5B shows a communication protocol of a G2/G3 facsimile machine of the first embodiment.

FIGS. 5A and 5B show a communication protocol for when the first embodiment is applied to a G2/G3 dual mode facsimile machine. Only the procedure signals to be transmitted are different. FIG. 5B shows a procedure for the first embodiment and FIG. 5A shows a procedure for a conventional G3 machine for comparison purpose.

In the prior art system, when the facsimile machine calls, the line is switched to the facsimile machine at a time T1 and then the CED signal is sent out. Then, a DIS (digital identification signal) and the GI2 signal are sent out at the interval descrited above. If the calling station is the telephone set, the line is cut off at the time T2 after the elapse of the initial identification period and the speech communication is not achieved.

In the first embodiment, as shown in FIG. 5B, the line is switched to the facsimile machine at time T, the CED and DIS signals are sent out and then the signal on the line is outputted from the buzzer speaker 19 during the subsequent interval of the procedure signal. Accordingly, the sound therefrom is outputted from the buzzer speaker. Thus, if the operator at the called station hears the sound, he/she switches the line at time T3 so that speech communication is achieved thereafter.

Thus, when the facsimile machine is in the auto-receive mode, the type of the calling station terminal can be identified by the sound generated by the buzzer speaker so that an appropriate operation is done if the calling station is the sound terminal such as telephone set and the line can be effectively utilized by the facsimile machine and the telephone set in spite of the auto-receive mode. In the first embodiment, as shown in FIG. 3, the buzzer speaker is disconnected from the line when the procedure signal from the calling station is received and the buzzer speaker is separated from the line during the transmission of the procedure signal. Accordingly, annoying sound due to the procedure signal is prevented from being generated by the buzzer speaker.

A second embodiment which enables speech communication between the calling station and the called station irrespective of the communication mode of the calling station is now explained.

Figures 6, 6A:
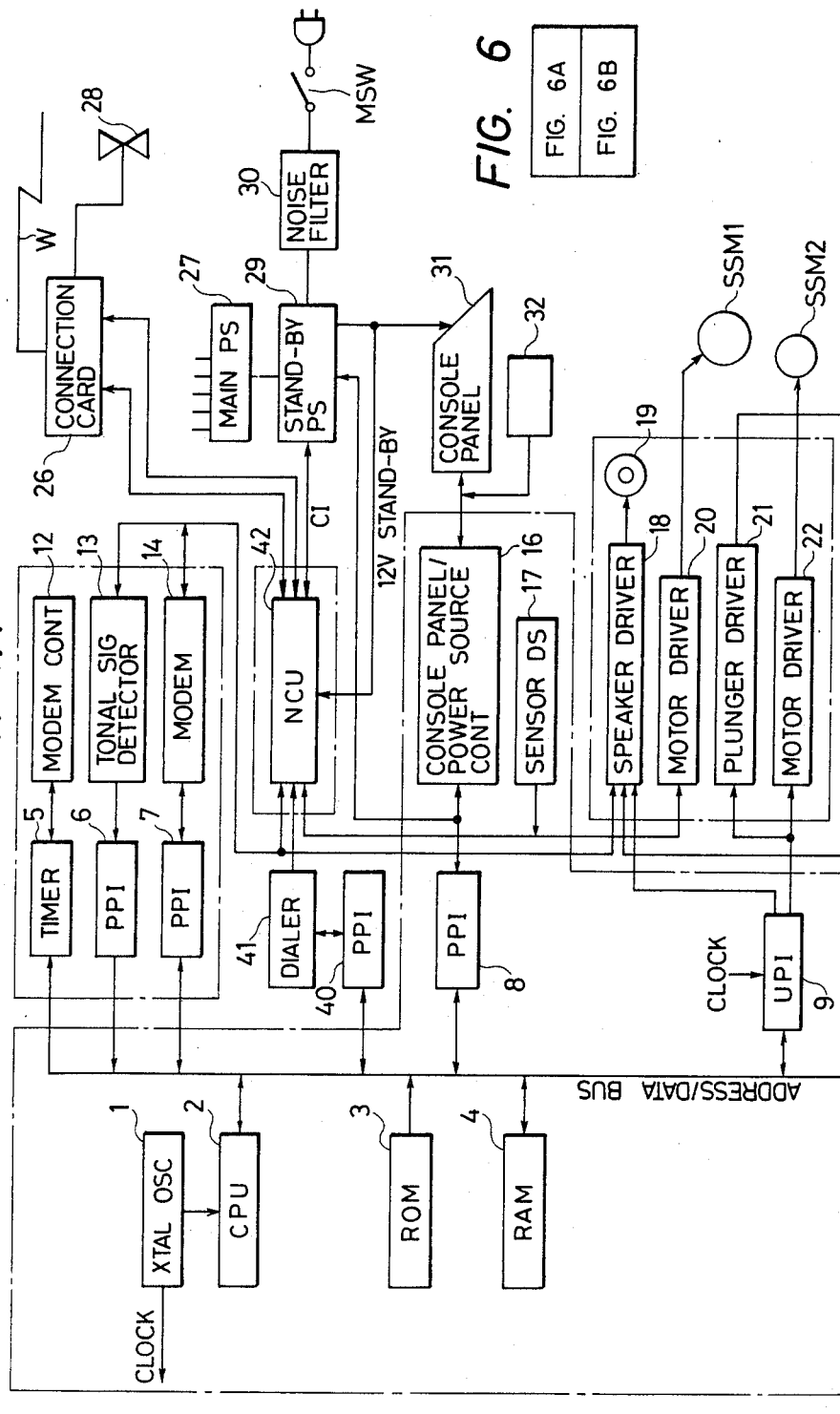
FIGS. 6A and 6B represent a block diagram of an overall configuration of a second embodiment of the present invention.
Figure 6B:
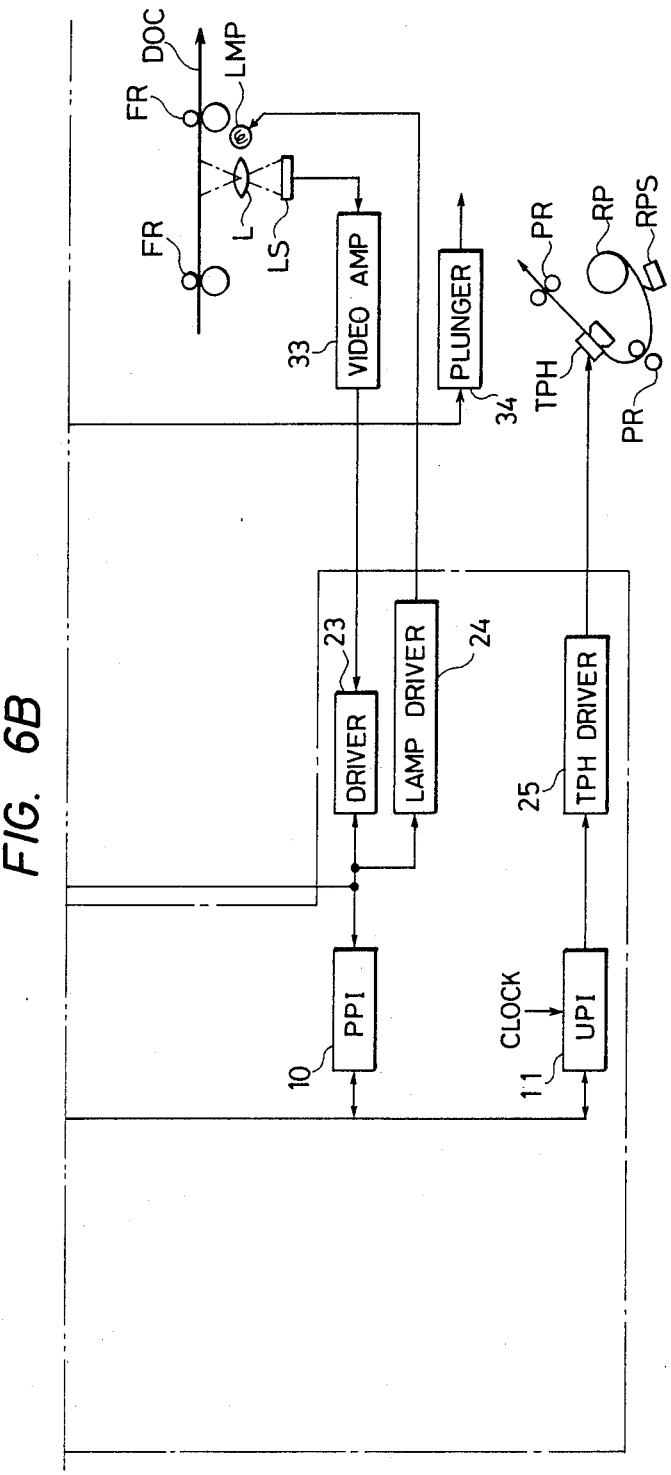

FIG. 6, consisting of FIGS. 6A and 6B, is a block diagram of an overall configuration of the second embodiment of the facsimile machine. The like blocks to those shown in FIG. 1 are designated by like numerals and they are not explained here. Only the difference from FIG. 1 is explained. Numeral 40 denotes a programmable parallel I/O (PPI), and numeral 41 denotes a dialer. When a dialing command signal and a dial number signal are supplied to the dialer 41 from the CPU 2 through the PPI 40, the dialer 41 sends out a dial signal to the telephone line W through an NCU 42 which switches the telephone line W from the telephone set to the facsimile machine depending on the auto-receive mode or the auto-send mode.

Figure 7:
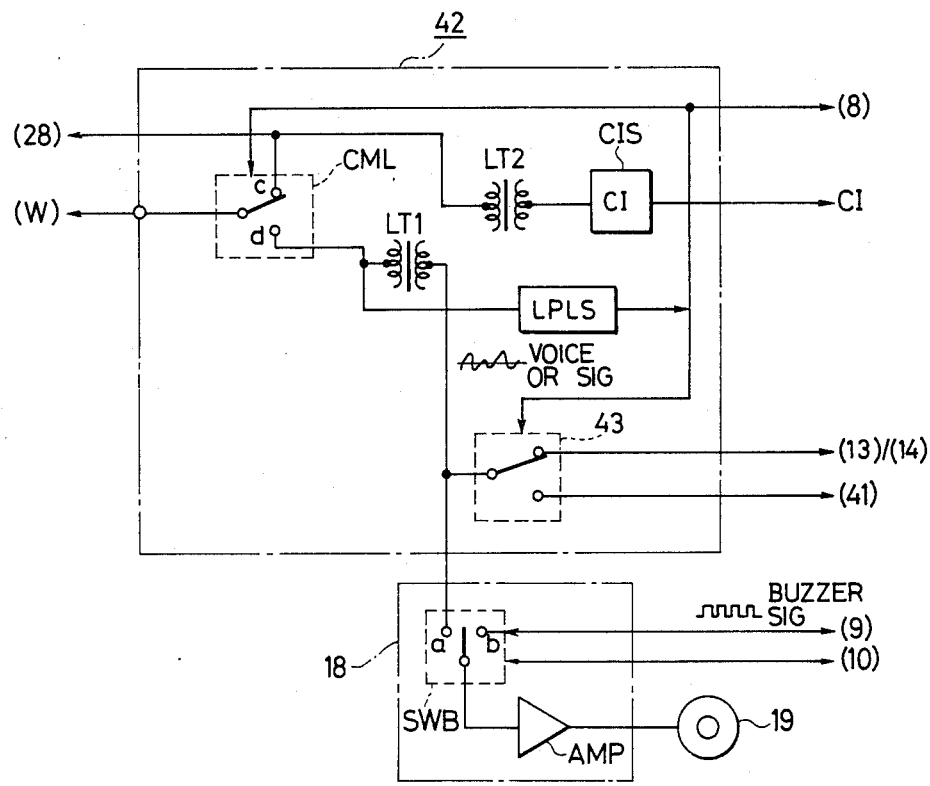
FIG. 7 is a block diagram of the periphery of the NCU in the second embodiment.

FIG. 7 shows a major portion of the NCU 42 and the speaker driver 18. The telephone line W is normally connected to the telephone set 28 by the relay CML. The telephone line 28 is connected to the upper terminal of the relay CML and the call signal detector CIS is also connected to the upper terminal of the relay CML through the insulation transformer LT2. When the call signal is received from the line, the call signal detector CIS produces the call signal detection signal CI so that the main power supply is activated and the activated CPU 2 switches the relay CML to the tonal detector 13 and the modem 14 through the PPI 8. A polarity reversal detector LPLS is connected to a lower terminal of the relay CML and the switching relay 43 and the speaker driver 18 are also connected to the lower terminal through the insulation transformer LT1.

The switching relay 43 selectively connects the tonal detector 13 and the modem 14 or the dialer 47 to the secondary winding of the transformer LT1. Normally, the tonal detector 13 and the modem 14 are connected to the secondary winding of the transformer LT1. When the facsimile machine is in the auto-send mode, the relay CML is switched to the lower terminal to select the facsimile machine and the relay 43 is switched to the dialer 41. Thus, the dialer 41 is connected to the telephone line W through the relay CML, transformer LT1 and relay 43. The dialing command and the dial number signal are supplied from the CPU 2 to the dialer 41 through the PPI 10, and the dial signal is sent out of the dialer 41 to the telephone line W.

When the dial signal is sent to the telephone line W, the polarity reversal is detected by the polarity reversal detector LPLS to monitor conflict and detect the connection of the telephone line (looping of the telephone line) in the receiving station.

After the dial signal has been sent to the telephone line W, the polarity reversal on the telephone line W is detected by the polarity reversal detector LPLS and a polarity reversal detection signal from the LPLS is supplied to the CPU 2 through the PPI 8 so that the looping of the telephone line is confirmed. Thereafter, the CPU 2 sends the switch signal to the relay 43 through the PPI 8 to connect the telephone line W to the modem 14 through the relay 43 to conduct the facsimile procedure. The operation of the speaker driver 18 is identical to that explained in FIG. 2.

The NCU 15 shown in FIG. 2 has an off-hook detector for various known communication controls although it is not shown in FIG. 2.

The auto-send operation in the above configuration is explained in detail with reference to a flow chart of FIG. 8. The control procedure of the CPU 2 in the G2 facsimile procedure in accordance with the CCITT Recommendation T3 is illustrated.

Figure 8:
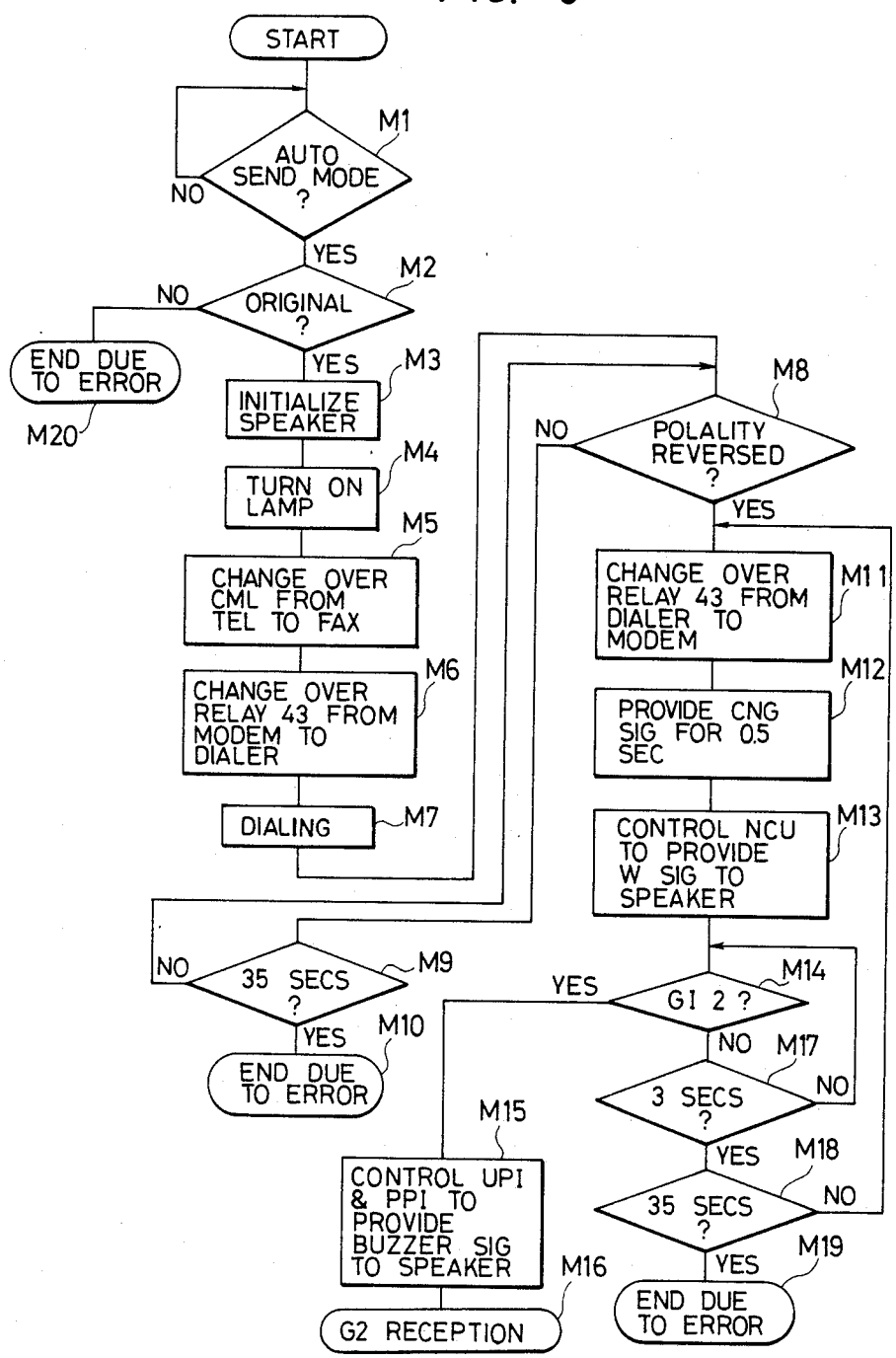
FIG. 8 is a flow chart of a communication protocol of the second embodiment

In a step M1 in FIG. 8, the CPU 2 checks if the auto-send mode or not, and if it is, the process proceeds to a step M2. When an input is applied by the console panel prior to the auto-sending the facsimile machine executes the operation for that input. If a signal is received prior to the auto-sending, the operation for the reception is performed.

In the step M2, the CPU 2 examines the output of the document sensor DS to determine the presence or absence of the document sheet DS. If the document sheet is absent, the process proceeds to a step M20 where the main power supply is turned off through the PPI 8 and the communication is terminated with error. The alarm sound may be generated by the speaker 19.

In a step M3, the speaker 19 is initialized. The CPU 2 connects the switch SWB of FIG. 7 to the right contact b through the PPI 10 to allow the reception of the drive signal from the UPI 9. The timer 5 is started at this moment to control timings such as a detection time of the polarity reversal and the initial identification time period necessary for the preprocedure of the facsimile communication.

In a step M4, the light source LMP of the document reader is turned on in order to stabilize the light output of the light source LMP in case the image is to be transmitted. In a step M5, the relay CML is switched from the telephone set to the facsimile machine. In a step M6, the relay 43 is switched from the modem to the dialer, and in a step M7, the dial signal is sent to the telephone line W. In a step M8, the polarity reversal is detected. If it is not detected, the process goes to a step M9 where the steps M8 and M9 are repeatedly executed until the timer 5 counts 35 seconds to detect the polarity reversal. In a step M9, when the timer has counted 35 seconds, the process proceeds to a step M10 where the communication is terminated with error. If the polarity reversal is detected in the step M8, the process proceeds to a step M11 where the relay 43 is switched from the dialer to the modem. The timer 5 is reset and restarts to count.

In a step M12, a calling tone (CNG) signal indicating that the calling station is a non-sound terminal is sent out to the telephone line for 0.5 second. In a step M13, the switch SWB is switched to the left contact in FIG. 7 so that the speaker 19 can be driven by the signal on the telephone line W. Accordingly, if the called station is the sound terminal and the operator says "hello", the word is generated from the speaker 19. In a step M14, whether the GI2 (group 2 identification) signal sent from the receiving station is detected by the tonal detector 13 or not is checked. The detection is effected until the timer 5 detects the elapse of 3 seconds in a step M17, that is, for 3 seconds. As is well known, in the G2 mode, the facsimile procedure is executed by the procedure signal (tonal signal) having the predetermined frequency and the signal from the partner station is identified by the tonal detector 13. The tonal detector measures the pulse width of the input signal from the telephone line W by the reference clock to detect the frequency of the received signal.

If the tonal detector 13 detects the G12 signal in the step M14, the switch SWB is again switched to the right contact in a step M15 to connect the speaker 19 to the UPI 9, and the G2 facsimile communication is performed in a step M16.

On the other hand, if the GI2 signal is not detected, the process goes from the step M17 to a step M18 where the timer 5 checks whether the predetermined initial identification period of 35 seconds has elapsed since the detection of the polarity reversal If the period of 35 seconds has not yet elapsed, the process returns to the step M11 and the above steps are repeated. If the period of 35 seconds has elapsed, the communication is terminated with error in a step M19, the switch SWB is connected to the UPI 9, the relay CML is connected to the telephone set 28 and then the main power supply 27 is turned off. The speaker 19 generates the error alarm sound.

Thus, if the calling station operator wants the speech communication, the sound is generated by the speaker and the operator connects the telephone set 28 to the line by the switch on the console panel 31 and can thereafter perform the speech communication. This is illustrated in FIGS. 9A and 9B.

FIG. 9B shows the facsimile procedure in the second embodiment and FIG. 9A shows the prior art facsimile procedure for comparison purpose.

As seen from FIG. 9A, when a call signal is issued to the telephone line by the auto-send function, the calling station facsimile machine detects the polarity reversal when the called station operator responds at time T4. When the polarity reversal is detected, the calling station facsimile machine switches the telephone line from the dialer to the modem, and sends a CNG signal after t5 time period (approximately 0.5 second). It repeatedly sends the CNG signal at an interval of t6 (3 seconds) and monitors the reception of the corresponding procedure signal.

However, since the called station terminal is the telephone set, it cannot send the procedure signal. Accordingly, after the elapse of the initial identification period t7 (35 seconds), the calling station facsimile machine cuts off the line at time T5 and terminates the communication with error.

On the other hand, in the present embodiment, as shown in FIG. 9B, when the line is switched from the telephone set to the facsimile machine at time T4, the speaker 19 generates the sound of the calling station operation if the calling station is the sound terminal because the speaker 19 of the facsimile machine is driven by the signal on the line except when the CNG signal is transmitted. Accordingly, the calling station operator manually switches the line to the telephone set at time T3 and can thereafter perform the speech communication.

In the second embodiment of the facsimile machine which is connected to the telephone line together with the telephone set and sends out the call signal to the line to perform the communication, sound output means driven by the signal sent from the called station is provided. Accordingly, the called station terminal can be identified by simple and inexpensive means, an appropriate manipulation can be requested to the operator and the single line can be effectively utilized for the facsimile machine and the telephone set.

While the second embodiment uses the G2 facsimile machine, the present invention can be applied to a G3 facsimile machine.

In the second embodiment, if the sending station performs the auto-send operation while the receiving station facsimile machine is down, the unavailability of the receiving station machine can be made known to the sending station operator.

Figure 10:
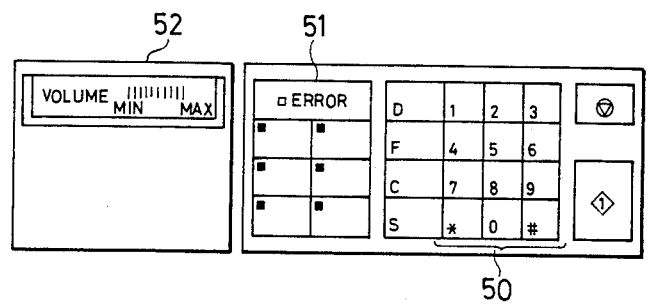
FIG. 10 is a plan view of a console panel in a third embodiment of the present invention.

A third embodiment which enables adjustment of a sound level is now explained. FIG. 10 shows a console panel. Numeral 50 denotes a dialing keyboard. The transmission is effected by using the console panel. Numeral 51 denotes an error indicator and numeral 52 denotes a sound level indicator.

Figure 11:
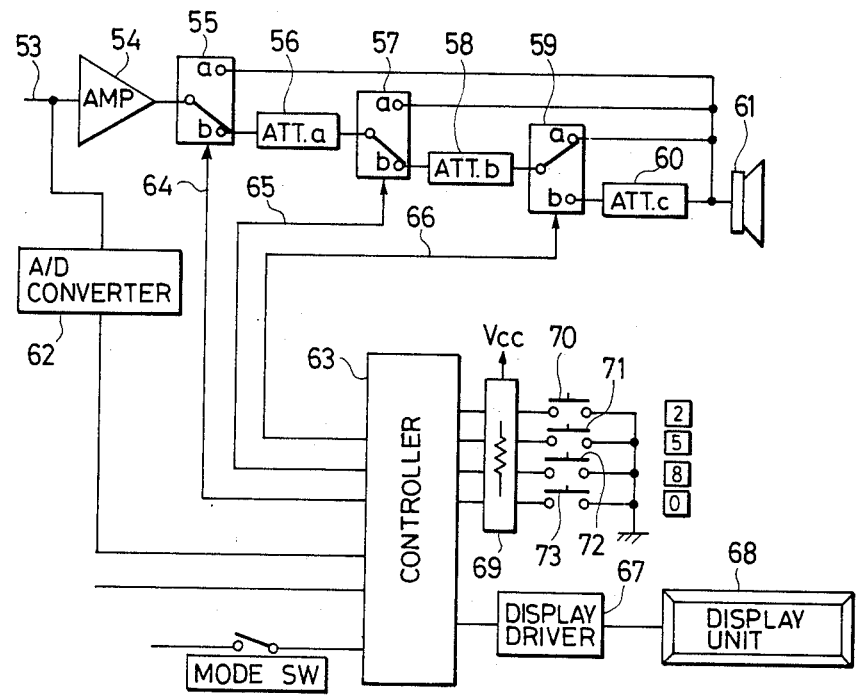
FIG. 11 is a block diagram of a control circuit of the third embodiment.

FIG. 11 shows a block diagram of a control circuit. Numeral 53 denotes a line which carries a sound signal and is connected to a switch 55 through an amplifier 54. The switch 55 is connected to a switch 57 through an attenuator 56, and the switch 57 is connected to a switch 59 through an attenuator 58. The swtich 59 is connected to a speaker 61 through an attenuator 60.

Terminals a of the switches 55, 57 and 59 are directly connected to the speaker 61. The signal line 53 is connected to a controller 63 through an A/D converter 62, and the controller 63 is connected to the switches 55, 57 and 59 through signal lines 64–66. A display 68 is connected to the controller 63 through a display driver 67. Switches 70–73 are connected to the controller 63 through a pull-up resistor array 69. Those switches are used to select a sound level. The sound levels are represented by "2", "5", "8" and "0" in descending order and they correspond to the switches 70–73. When none of the switches 70–73 is depressed the output from the controller 63 is not changed and the path of the sound signal to the speaker 61 is not changed. However, if, for example, the switch 71 for "5" is depressed, the corresponding signal line assumes low level. Then, the controller 63 sends out signals to the signal lines 64 and 65 to switch the switch 55 to a terminal b and switch the switch 57 to the terminal a. Under this condition, the sound signal passes through the amplifier 54, the attenuator 56 and the terminal a of the switch 57 to the speaker 61.

When other switch is depressed the controller 63 sends out signals to the signal lines 63–66 to switch the switches 55, 57, 59 so that the sound signal passes through the line corresponding to the depressed switch. The controller 63 also sends a signal for displaying the adjusted sound level, to the display through the display driver 67.

The operation of the third embodiment is explained. The sound level in the telephone line varies with a speaker. The sound signal is applied to an A/D converter 62 to digitize it, and a digital signal therefrom is supplied to the controller 63 so that it is monitored by the controller 63 and controlled to an optimum sound level. A desired maximum sound level may be selected by a user through the key depression.

Figure 12:
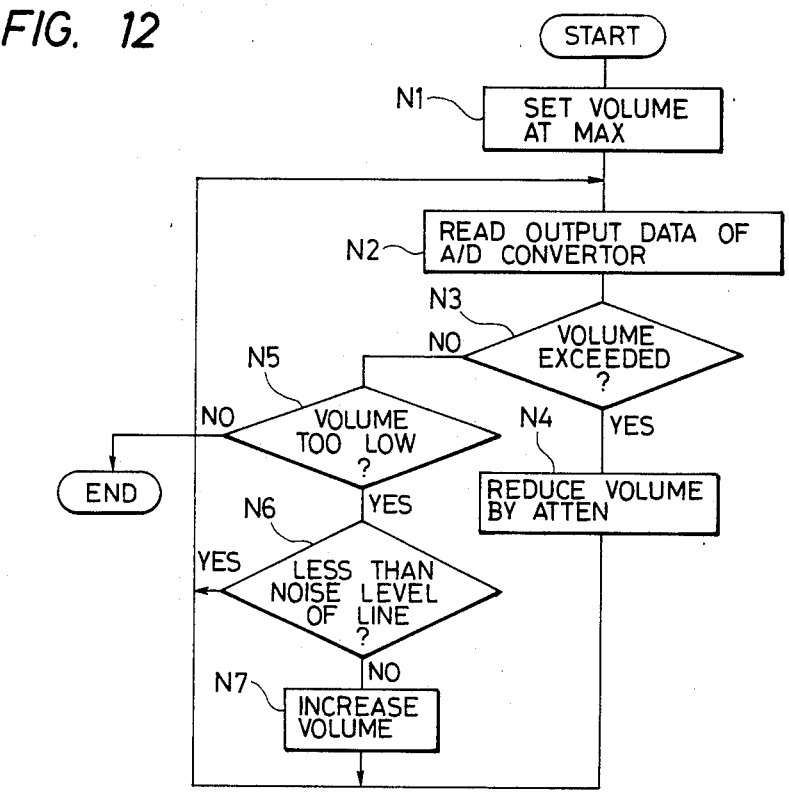
FIG. 12 is a flow chart showing control operation of the third embodiment.

FIG. 12 is a flow chart showing a control operation of the controller 63. In a step N1, the maximum sound level is set by the operator. In a step N2, an actual sound level of the sound signal is read as the output of the A/D converter 62. In a step N3, whether the sound signal level exceeds the preset sound level or not is checked. If it exceeds, the process proceeds to a step N4 where switching signals are sent to the switches 55, 57 and 59 to insert more attenuators to lower the sound level. If the sound level does not exceed the preset level in the step N3, the process proceeds to a step N5 where whether the sound level is too low to hear or not is checked. If it is not too low, the sound level control routine is terminated. If it is too low, the process proceeds to a step N6 where the sound level is compared with a noise level of the telephone line to determine the presence or absence of the sound. The noise level has been preset to an anticipated noise level. If the sound level is lower than the noise level, the process returns to the step N2. If the sound level is higher than the noise level, the process proceeds to a step N7 where the controller 63 sends out the switching signal to remove the attenuator to increase the sound level.

Of the above steps N1 to N7, the step N1 is to be executed only once, and whenever the telephone line changes, the steps N2 to N7 are carried out. Because there is no great change in the sound signal on the same line, the routine may be executed for a predetermine period or several times. In this manner, the sound level is semi-automatically controlled.

Figure 13:
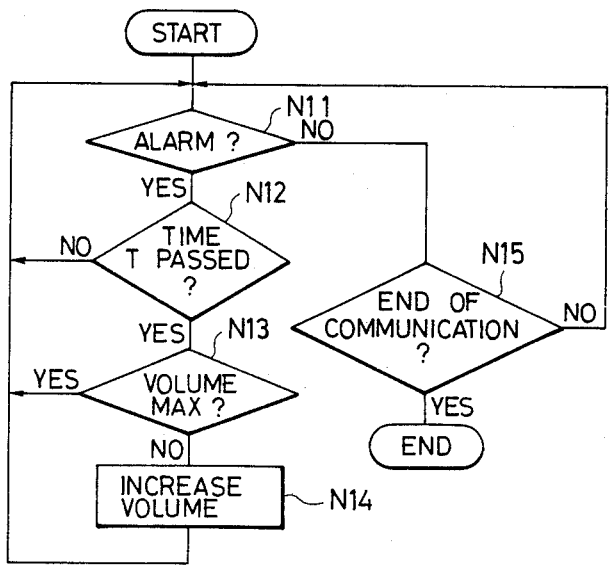
FIG. 13 is a flow chart showing control operation of the third embodiment.

The operator of the facsimile machine may not stay near the machine until the operation is terminated because a long time is required from the start to the end of the facsimile transmission. In such a case, the operator may not hear the alarm even if the facsimile machine issues it. Thus, the controller sends out the switching signal to increase the sound level if the alarm is continuously issued for more than a predetermined period. The control therefor is shown in FIG. 13.

In a step N11, whether the alarm is being issued or not is checked, and if it is, the process proceeds to a step N12, and if it is not, the process proceeds to a step N15. In a step N15, whether the facsimile communication is terminated or not is checked, and if it is not, the process returns to the step N11. In the step N12, whether the alarm has been issued for a predetermined time period T (for example, 5 seconds) or not is checked, and if it has, the process proceeds to a step N13. In the step N13, whether the sound level maximum or not is checked, and if it is, the process returns to the step N11, and if it is not, the process proceeds to a step N14. In the step N14, the controller 63 sends the switching signal to remove the attenuator to increase the sound level. If the alarm is still being issued after another predetermined time period, the above steps are repeated until the sound level reaches maximum. In this manner, the sound level change in time can be controlled.

In the third embodiment, the alarm and other sound level can be set by the selection of the switches on the console panel, and the sound level is controlled by the controller in accordance with the setting of the sound level. Accordingly, the user can readily control the sound level without an external volume controller. The sound level can also be automatically controlled in accordance with the internal operating condition of the machine so that the operator can quickly catch the information from the facsimile machine.

While the first, second and third embodiments use the facsimile machine, the present invention can be applied to other communication equipment such as telex machine which communicates through a line.

In the first and second embodiments, the sound from the partner station is outputted by the speaker. Alternatively, an alarm sound or display device such as buzzer, an LED or the like may be used to indicated that the partner station is the sound terminal.

What we claim is:

1. A data communication equipment for communication via a line, said equipment comprising:
    data communication means for communicating data and for receiving data;
    speech communication means for communicating speech;
    selection means for selecting said data communication means or said speech communication means to set said data communication equipment in a data communication mode or a speech communication mode; and
    output means for outputting a sound on the basis of a sound signal received through the line when said equipment is in the data communication mode which has been set by said selection means, said data communication equipment further comprising detection means for detecting a procedure signal for data communication, wherein said output means is stopped when said detection means detects the procedure signal.

2. A data communication equipment according to claim 1, further comprising means for sending a procedure signal for data communication, wherein said output means is disconnected from the line during the transmission of the procedure signal.

3. A data communication equipment for communication via a line, said equipment comprising:
    auto-receive means for automatically receiving data;
    speech communication means for communicating speech;
    mode selection means for selecting said auto-receive means or said speech communication means to set said data communication equipment in an auto-receive mode or a speech communication mode; and
    output means for outputting a sound on the basis of a sound signal received through the line when said equipment is in the auto-receive mode which has been set by said mode selection means, said data communication equipment further comprising detection means for detecting a procedure signal for data communication, wherein said output means is stopped when said detection means detects the procedure signal.

4. A data communication equipment according to claim 3, further comprising means for sending a procedure signal for data communication, wherein said output means is disconnected from the line during the transmission of the procedure signal.

5. A data communication equipment for communication via a line, said equipment comprising:
    auto-send means for automatically sending data;
    speech communication means for communicating speech;
    mode selection means for selecting said auto-send means or said speech communication means to set said data communication equipment in an auto-send mode or a speech communication mode; and
    output means for outputting a sound on the basis of a sound signal received through the line when said equipment is in the auto-send mode which has been set by said mode selection means, said data communication equipment further comprising detection means for detecting a procedure signal for data communication, wherein said output means is stopped when said detection means detects the procedure signal.

6. A data communication equipment according to claim 5, further comprising means for transmitting a procedure signal for data communination, wherein said output means is disconnected from the line during the transmission of the procedure signal.

* * * * *

UNITED STATES PATENT AND TRADEMARK OFFICE
CERTIFICATE OF CORRECTION

PATENT NO. : 4,773,080
DATED : September 20, 1988
INVENTOR(S) : TOSHIFUMI NAKAJIMA ET AL.   Page 1 of 3

It is certified that error appears in the above-identified patent and that said Letters Patent is hereby corrected as shown below:

SHEET 10

Figure 8, "POLALITY" should read --POLARITY--.

SHEET 11

Figure 9A, "POLALITY" should read --POLARITY--.
    Figure 9B, "POLALITY" should read --POLARITY--.

SHEET 13

Figure 12, "A/D CONVERTOR" should read "A/D CONVERTER".

COLUMN 1

Line 31, "set" should read --set,--.
    Line 33, "the" should read --a--.

COLUMN 2

Line 7, "a" should read --the-- and "in" should read
        --set at--.

COLUMN 4

Line 14, "reley" should read --relay--.

UNITED STATES PATENT AND TRADEMARK OFFICE
CERTIFICATE OF CORRECTION

PATENT NO. : 4,773,080

DATED : September 20, 1988

INVENTOR(S) : TOSHIFUMI NAKAJIMA ET AL.

It is certified that error appears in the above-identified patent and that said Letters Patent is hereby corrected as shown below:

COLUMN 5

Line 12, "a" should be deleted.
        Line 13, "tion 13" should read --tor 13-- and "GC2 signl" should read --GC2 signal--.
        Line 18, "freguency" should read --frequency--.
        Line 30, "procedes" should read --proceeds--.
        Line 46, "the" (first occurrence) should be deleted.
        Line 66, "time T2" should read --time t2--.

COLUMN 6

Line 25, "signal and" should read --signal) and--.
        Line 26, "descrited" should read --described--.

COLUMN 7

Line 7, "telephone line 28" should read --telephone line W--.
        Line 21, "dialer 47" should read --dialer 41--.

COLUMN 9

Line 67, "switch 59" should read --switch 59--.

COLUMN 10

Line 12, "depressed" should read --depressed,--.
        Line 66, "predetermine" should read --predetermined--.

UNITED STATES PATENT AND TRADEMARK OFFICE
CERTIFICATE OF CORRECTION

PATENT NO. : 4,773,080
DATED : September 20, 1988
INVENTOR(S) : TOSHIFUMI NAKAJIMA ET AL.    Page 3 of 3

It is certified that error appears in the above-identified patent and that said Letters Patent is hereby corrected as shown below:

COLUMN 11

Line 1, "may not" should read --may by chance not--.
Line 19, "maximum" should read --is maximum--.
Line 45, "indicated" should read --indicate--.

COLUMN 12

Line 57, "communination" should read --communication--.

Signed and Sealed this

Eighteenth Day of July, 1989

Attest:

DONALD J. QUIGG

Attesting Officer    Commissioner of Patents and Trademarks